(12) United States Patent
Moon et al.

(10) Patent No.: US 6,426,939 B1
(45) Date of Patent: Jul. 30, 2002

(54) METHOD FOR PREVENTING A COLLISION OF AN EXTENDED ORTHOGONAL CODE

(75) Inventors: Doo Young Moon, Seoul; Myeong Hwan Lee, Gyung Gi-Do; Sang Hun Sung, Seoul, all of (KR)

(73) Assignee: LG Information & Communications, Ltd., Kyongki-do (KR)

( * ) Notice: Subject to any disclaimer, the term of this patent is extended or adjusted under 35 U.S.C. 154(b) by 0 days.

(21) Appl. No.: 09/207,812

(22) Filed: Dec. 9, 1998

(30) Foreign Application Priority Data

Dec. 31, 1997 (KR) .............................. 97-82193

(51) Int. Cl.$^7$ .............................................. H04B 7/216
(52) U.S. Cl. ........................................ 370/203; 370/208
(58) Field of Search .............................. 370/208, 320, 370/335, 342, 441, 203

(56) References Cited

U.S. PATENT DOCUMENTS 5,793,759 A * 8/1998 Rakib et al. ................. 370/342
6,091,760 A * 7/2000 Giallorenzi et al. ........ 375/140

* cited by examiner

Primary Examiner—Wellington Chin
Assistant Examiner—Brenda Pham
(74) Attorney, Agent, or Firm—Long Aldridge & Norman LLP

(57) ABSTRACT

A method for preventing a collision of an extended orthogonal code uses an extended orthogonal code applying a hadamard code, and prevents an extended orthogonal code's collision occurred by a duplicated address among a plurality of subscriber channels, in a wideband code division multiple access wireless local loop (WCDMA-WLL) communication system. The method effectively prevents an address collision among a plurality of channels in case that the channels having different data transmission speeds are simultaneously transmitted by using one WCDMA-WLL frequency. As a result, when a plurality of subscribers is divided by using an extended orthogonal code in a WCDMA-WLL system supporting a multiple-data transmission speed, the method prevents an allocation of a collidable matrix code. Also, the method prevents an error generated in dividing subscriber channels caused by a code collision, and thus enhances a reliability and a stability of a communication system.

14 Claims, 10 Drawing Sheets

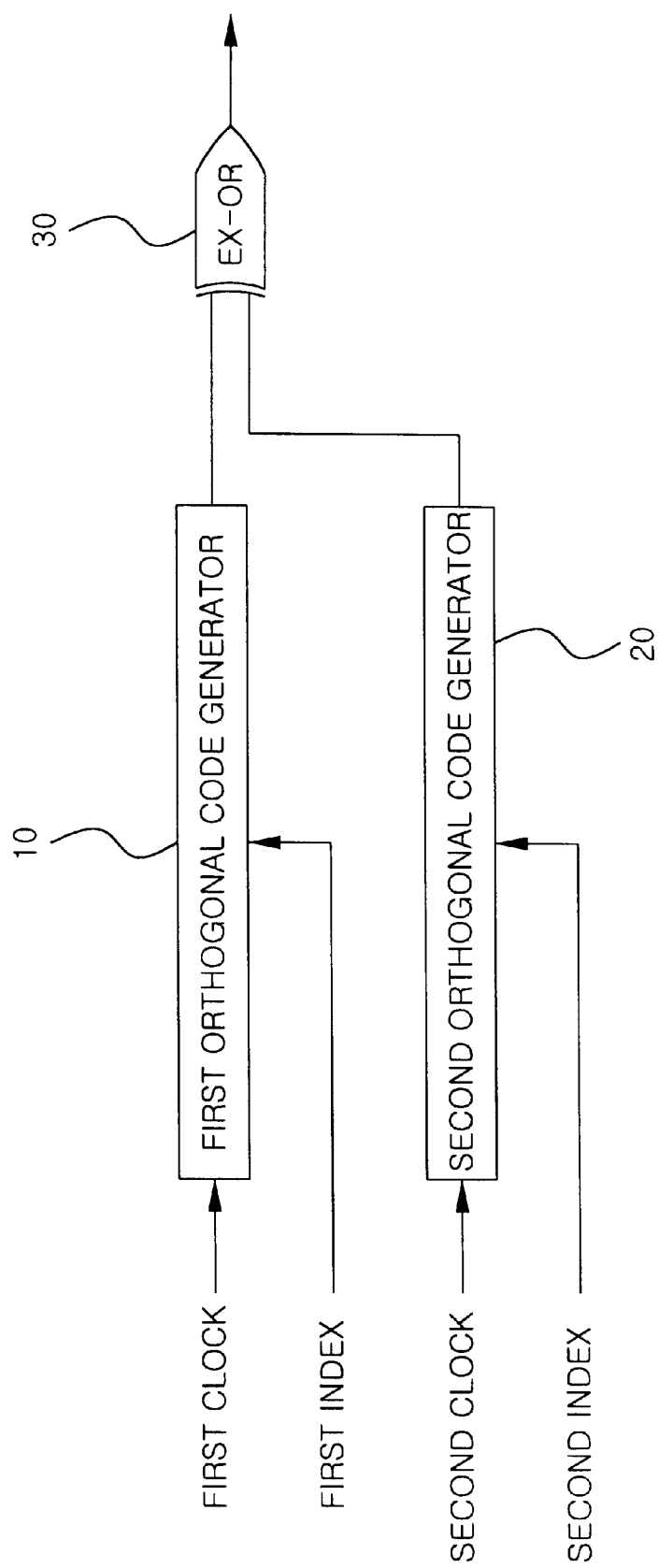

BASIC ORTHOGONAL CODE

8TH EXTENDED ORTHOGONAL CODE

16TH EXTENDED ORTHOGONAL CODE $$\begin{matrix} H^{3} & H^{3} \\ & & \longrightarrow & H^{4} \\ H^{3} & \overline{H}^{3} \end{matrix}$$

32TH EXTENDED ORTHOGONAL CODE

Fig. 2g

64TH EXTENDED ORTHOGONAL CODE $$\begin{matrix} H^5 & H^5 \\ H^5 & \overline{H}^5 \end{matrix} \longrightarrow H^6$$

US 6,426,939 B1

METHOD FOR PREVENTING A COLLISION OF AN EXTENDED ORTHOGONAL CODE

BACKGROUND OF THE INVENTION

1. Field of the Invention

The present invention generally relates to a method for preventing a collision of an extended orthogonal code which uses an extended orthogonal code applying a hadamard code, and prevents an extended orthogonal code's collision occurred by a duplicated address based upon a multi rate traffic among a plurality of subscriber channels, in a wideband code division multiple access wireless local loop (hereinafter referred to as a WCDMA-WLL) communication system. More particularly, it relates to a method for preventing a collision of an extended orthogonal code which effectively prevents an address collision among a plurality of channels in case that the channels having different data transmission speeds are simultaneously transmitted by using one WCDMA-WLL frequency.

2. Description of the Prior Art

Conventionally, in case that a plurality of subscribers transmit a digital data by using one frequency in a WCDMA-WLL system, an extended orthogonal code has been used to divide each subscriber channel, and specifically a hadamard code among several orthogonal codes has been used to divide the same.

In order to correspond to the increasing subscriber's channel number, such an extended orthogonal code generates an extended orthogonal code corresponding to the number of subscribers on the basis of a basic orthogonal code, and discriminates each subscriber channel.

The prior art will now be described with reference to the accompanying drawings.

FIG. 1 is a block diagram of an extended orthogonal code generator by a general hadamard code generator;

FIGS. 2A–2G show an extended state of an orthogonal code using a hadamard code in each of extended degrees; and FIG. 3 is a state diagram of an extended orthogonal code occurring a data transmission speed difference according to one example of the prior art.

In more detail, FIG. 2A is a 1st extended orthogonal code. The extended orthogonal code shown in FIG. 2A divides a digital data into only two data "1" and "0", and simultaneously uses only one channel.

FIG. 2B is a hadamard 2nd extended orthogonal code. The 2nd extended orthogonal code shown in FIG. 2B divides a digital data into four data "11", "10", "00" and "01", and thus simultaneously uses two channels.

FIG. 2C is a hadamard 4th extended orthogonal code. The 4th extended orthogonal code shown in FIG. 2C divides a digital data into eight data "1111", "1010", "1100", "1001", "0000", "0101", "0011" and "0110", and thus simultaneously uses four channels. In the same manner, a hadamard 8th extended orthogonal code shown in FIG. 2D can use 8 channels simultaneously in one frequency. A hadamard 16th extended orthogonal code shown in FIG. 2E can use 16 channels simultaneously in one frequency. A hadamard 64th extended orthogonal code shown in FIG. 2G can use 64 channels simultaneously in one frequency.

Therefore, by extending the orthogonal code with a successive multiple, a plurality of subscribers increased by a code number of an extended degree can be accepted by the extended orthogonal code.

Referring to FIGS. 2A–2G, in order to easily explain the extended orthogonal code, a basic orthogonal code is indicated as H, the 2nd extended orthogonal code is indicated as H', the 4th extended orthogonal code is indicated as H", the 8th extended orthogonal code is indicated as H''', the 16th extended orthogonal code is indicated as $H^4$, the 32th extended orthogonal code is indicated as $H^5$, and the 64th extended orthogonal code is indicated as $H^6$.

As the number of subscribers increases in WCDMA-WLL system, each subscriber may use a specific data transmission speed. That is, in case that one subscriber transmits a digital data with a transmission speed of 32 Kbps, another subscriber transmits a digital data with a transmission speed of 64 Kbps being double of 32 Kbps, or a still another subscriber transmits a digital data with a transmission speed of 128 Kbps being quadruple of 32 Kbps, a collision portion wherein the extended orthogonal codes for discriminating each subscriber channel are overlapped occurs by a transmission speed difference. Therefore, it is impossible to discriminate each subscriber channel, and an error occurs in a transmitted digital data.

The aforementioned example will now be described with reference to FIG. 3.

If 8th extended orthogonal code of FIG. 2D is used as a hadamard orthogonal code for discriminating each subscriber, and one subscriber uses a 1st matrix code among the 8th extended orthogonal codes as a channel address with a transmission speed of 32 Kbps, the remaining 7 matrix codes can be used by another subscriber.

In other words, subscribers who want to occupy a matrix code degree (or channel) later can use all of the remaining 7 matrix codes of the 8th extended orthogonal code, in case that the subscribers transmit a digital data with the same transmission speed as that of a subscriber first occupying a specific matrix code(or channel).

However, in case of using a transmission speed of 64 Kbps being. double of 32 Kbps, an extended orthogonal code to be overlapped with the first occupied extended orthogonal code occurs by a transmission speed difference between 32 Kbps and 64 Kbps.

Namely, if the 1st matrix code of 8th extended orthogonal code is employed with a transmission speed of 32 Kbps as shown in FIG. 3(a), and a 5th matrix code of 8th extended orthogonal code is employed with a transmission speed of 64 Kbps as shown in FIG. 3(b), an analysis result by a hadamard code of discriminating each matrix code or channel shows the same extended orthogonal code as shown in an oval circle symbol "O" of FIGS. 3(c)–3(e).

Accordingly, in case of transmitting a subscriber's digital data with a transmission speed of 64 Kbps, both the 1st matrix code previously transmitting the digital data with the transmission speed of 32 Kbps and the 5th matrix code which may appear as the 1st matrix code, cannot be used as a channel.

As a result, the remaining 6 matrix codes excepting the 1st and 5th matrix codes, i.e., 2nd, 3rd, 4th, 6th, 7th and 8th matrix codes, can be used as a channel for discriminating a plurality of subscribers.

Also, if a still another subscriber wants to transmit a digital data with a transmission speed of 128 Kbps, the same extended orthogonal code appears as shown in the oval circle symbol "O" of FIGS. 3(c)–3(e).

By a portion to be overlapped with the 1st matrix code of 8th extended orthogonal code, it is difficult to discriminate each matrix code, so that 3rd, 5th and 7th matrix codes cannot be used as a channel for discriminating a plurality of subscribers, only 2nd, 4th, 6th and 8th matrix codes can be used.

As stated above, in the prior digital data communication technique for discriminating a plurality of subscribers by using the extended orthogonal code applying the hadamard code in the WCDMA-WLL system, if even one subscriber among the plurality of subscribers uses a digital data transmission speed different from that of another subscriber, a duplicated matrix code pattern occurs in a pulse pattern of the transmitted digital data.

As a result, in a digital data communication by a plurality of subscribers, the prior art occurs an error of a data communication, and destroys an orthogonal characteristic of each matrix degree in the extended orthogonal code functioning as an address for discriminating each channel.

SUMMARY OF THE INVENTION

Accordingly, the present invention is directed to a method for preventing a collision of an extended orthogonal code that substantially obviates one or more of the problems due to limitations and disadvantages of the conventional art.

It is an objective of the present invention to provide a method which transmits the digital data having a different transmission speed of a plurality of subscribers without an error, by using an extended orthogonal code.

More specifically, the objective of the present invention is to provide a method for preventing a collision of the extended orthogonal code in a WCDMA-WLL system, which prevents a collision among subscriber channels being occurred in discriminating a plurality of subscribers who respectively use a digital data having a different transmission speed.

To achieve the above objectives, in case that a plurality of subscribers transmit a digital data with a different transmission speed, the present invention previously deletes an extended orthogonal code's matrix code occurring a collision in a matrix code list, does not select the matrix code occurring a collision, and thus prevents a collision among the plurality of subscribers.

A method for preventing a collision among the plurality of subscribers includes the steps of:
  setting an initial value of a variable K indicating a matrix code to "1";
  checking an extended degree N of an orthogonal code;
  checking a multiple M of a data transmission speed, and determining a range of a variable L;
  allocating a Kth matrix code of an orthogonal code;
  determining whether the allocated matrix code is a matrix code presently used or a deleted code from a matrix code list;
  if the allocated matrix code is neither the matrix code presently used nor the deleted code, deleting (L*N)/M+Kth matrix code from the matrix code list; and
  determining whether there is a matrix code request requiring other matrix code.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

Further objects and other advantages of the present invention will become apparent from the following description in conjunction with the attached drawings, in which:

FIG. 1 is a block diagram of an extended orthogonal code generator applying a general hadamard code generator;

FIGS. 2A–2G show an extended state of an orthogonal code applying a hadamard code in each of degrees;

DETAILED DESCRIPTION OF THE PREFERRED EMBODIMENT

Figure 2A:
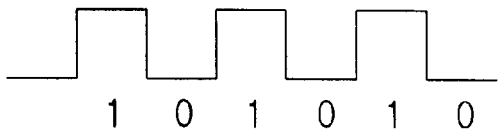
Figure 2B:
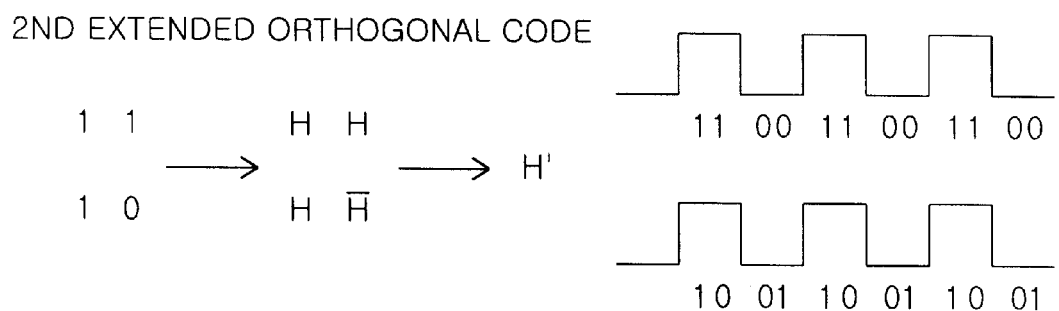
Figure 2C:
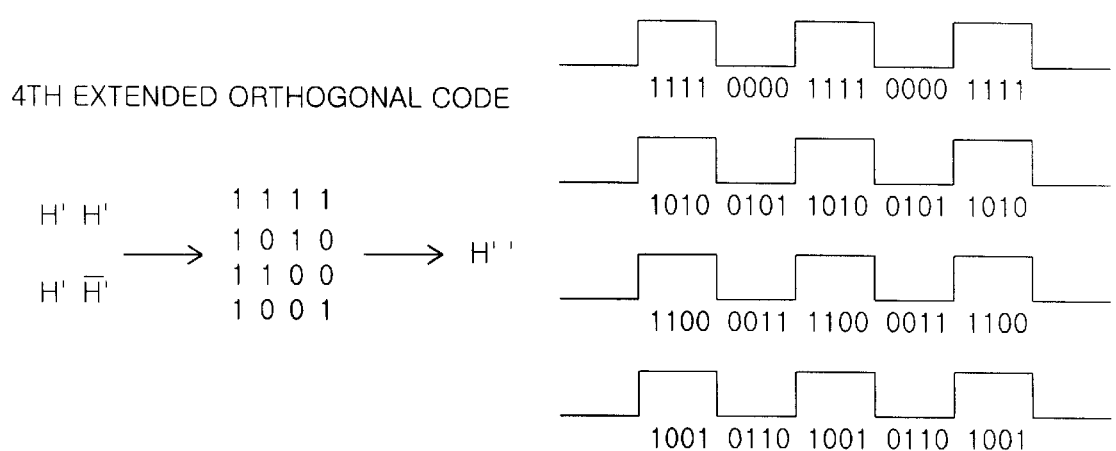
Figure 2F:
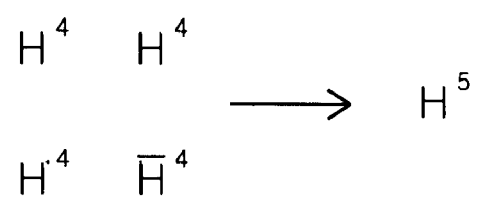

A preferred embodiment of the present invention will now be described in detail with reference to FIGS. 1–4.

An extended orthogonal code generator applying a hadamard code according to the present invention is shown in FIG. 1.

Referring to FIG. 1, a first clock has the same transmission speed as that of a transmitted digital data, and is applied to a 1st extended orthogonal code generator 10 being an extended orthogonal code generator of which degree corresponds to that a degree of an extended orthogonal code outputted from an exclusive-OR gate 30 is divided by 2.

A second clock is identical with a value generated when the first clock is divided by a degree of the 1st extended orthogonal code, and is applied to a 2nd extended orthogonal code generator 20 which always fixedly generates a 2nd extended orthogonal code.

That is, if a 16th extended orthogonal code is finally needed and its transmission speed is 32 Kbps, the 1st extended orthogonal code generator 10 becomes a 8th extended orthogonal code generator. Also, the 2nd extended orthogonal code generator 20 becomes a fixed 2nd extended orthogonal code generator, a first clock becomes 32 KHz and a second clock becomes 4 KHz. By a combination between a first index and a second index, a necessary degree among matrix codes of the extended orthogonal code is determined.

The output signals of the 1st extended orthogonal code generator 10 and the 2nd extended orthogonal code generator 20 are applied to the Exclusive-OR gate 30. Accordingly, a practically-needed extended orthogonal code applying a hadamard code can be obtained.

In a method for preventing a collision of the extended orthogonal code, the present invention's objective for preventing both a channel collision among many subscribers who respectively use a different transmission speed and a data error, is achieved by applying a control signal to the first index and the second index of the extended orthogonal code generator.

Figure 4:
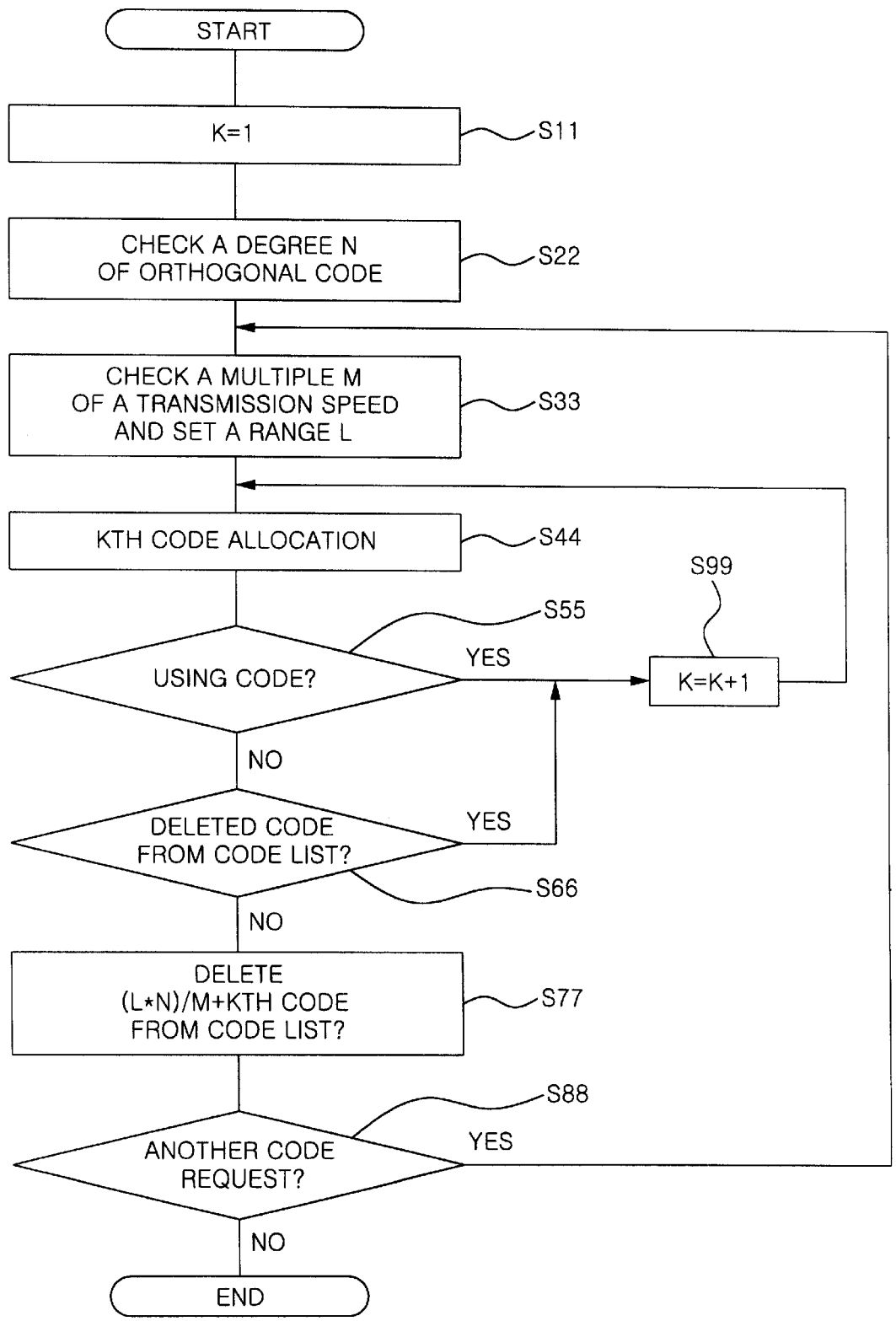
FIG. 4 is a flowchart illustrating a method for preventing a collision of the extended orthogonal code according to the present invention.

A method for preventing a collision of the extended orthogonal code is shown in FIG. 4.

As shown in FIG. 4, the method includes the steps of:
  setting (S11) an initial value of a variable K indicating a matrix degree of an extended orthogonal code to "1";
  checking (S22) an extended degree N of the extended orthogonal code;

checking (S33) a multiple M of a data transmission speed, and determining a range of a variable L;

allocating (S44) a Kth matrix code of the extended orthogonal code;

determining (S55 and S66) whether the allocated matrix code is a matrix code presently used or a deleted code from a matrix code list;

if the allocated matrix code is neither the matrix code presently used nor the deleted code, deleting (S77) (L*N)/M+Kth matrix code from the matrix code list; and determining (S88) whether there is a request of a matrix code requiring other matrix code.

The operations will now be described in more detail with reference to FIGS. 3 and 4.

Figure 3:
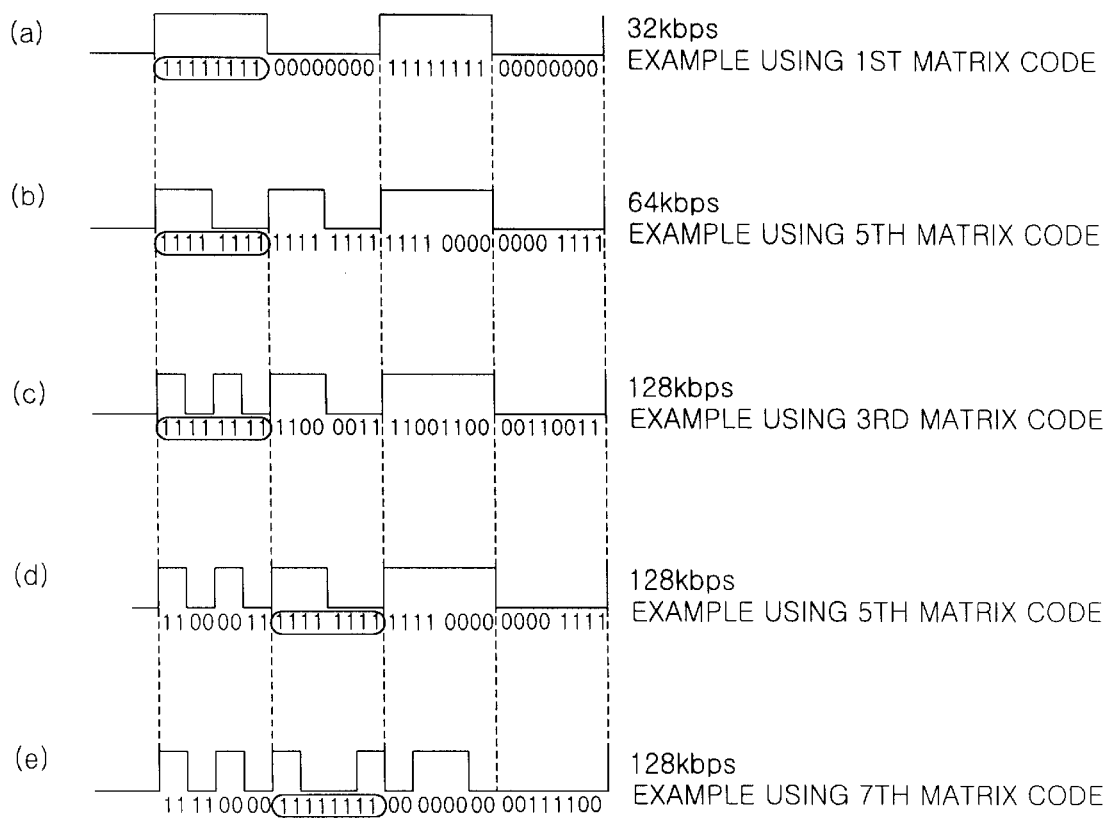
FIG. 3 is a state diagram of an extended orthogonal code occurring a data transmission speed difference according to one example of the prior art.

As shown in FIG. 3, in case that 8th extended orthogonal code is used in a WCDMA-WLL system, a first subscriber transmits a digital data with a transmission speed of 32 Kbps by using a 1st code of the 8th extended orthogonal code, and a second subscriber transmits a digital data with a transmission speed of 128 Kbps, the digital data of the second subscriber cannot use the 1st, 2nd, 5th and 7th codes.

That is, the 1st matrix code's "11111111" which is indicated as a hadamard code in a digital data having a transmission speed of 32 Kbps and is also indicated as "O" as shown in FIG. 3(a), and 3rd, 5th and 7th matrix code's "11111111" which are indicated as a hadamard code in a digital data having a transmission speed of 128 Kbps and are also indicated as "O" as shown in FIGS. 3(a)–3(c), make it impossible to discriminate the subscriber channel, and generate the digital data error.

Based on the above concept, a following equation can be made:

A collided extended orthogonal code=(L×N)/M+K where,

K: a matrix code degree of an extended orthogonal code being presently used by a subscriber of a lowest data transmission speed;

M: a natural number and a multiple between the lowest data transmission speed and a present high data transmission speed;

N: an extended degree of the extended orthogonal code being presently used; and

L: 0, 1, 2, . . . , M−1.

Assuming that the above equation is applied to the aforementioned preferred embodiment, K=1st matrix code, M=4, N=8th extended orthogonal code, and L=0,1,2,3.

Accordingly, the equation results in (0×8)/4+1=1, (1×8)/4+1=3, (2×8)/4+1=5, and (3×8)/4+1 32 7.

If a signal having a data transmission speed of 32 Kbps is transmitted by using the 1st matrix code, the 1st, 3rd, 5th and 7th matrix codes having a data transmission speed of 128 Kbps can not be used.

In other words, a signal having the data transmission speed of 128 Kbps can use the remaining matrix codes, i.e., 2nd, 4th, 6th and 8th matrix codes.

FIG. 4 is a flowchart illustrating a method for preventing a collision of the extended orthogonal code.

Referring to FIG. 4, if there is a subscriber to transmit a digital data in a plurality of subscribers of a WCDMA-WLL system, a variable K indicating a matrix degree is initialized as "1" in a step S11. An extended degree N of a code generated by a hadamard extended orthogonal code generator shown in FIG. 1 is checked in a step S22.

Then, in a step S33, a transmission speed of each subscriber is checked, a multiple between the lowest data transmission speed and the highest data transmission speed is obtained, the multiple is recorded to a variable M, a range from "0" to "M−1" is determined, and thus a range of variable L is determined.

In a step S44, a 1st matrix code as recorded to the variable K is allocated to a subscriber channel having the lowest data transmission speed.

A step S55 determines whether the extended orthogonal code's 1st matrix code allocated in the step S44 is presently used or not.

If the 1st matrix code is presently used in the step S55, a step S99 adds "1" to the variable K and returns to the step S44.

However, if the 1st matrix code is not used in the step S55, a step S66 determines whether the code is a deleted code from a matrix code list. If the code is determined as the deleted code from the matrix code list, the step S66 returns to the step S99.

If the allocated code is not the deleted code and is a usable matrix code, a step S77 deletes matrix codes calculated by an equation (L×N)/M+K from the matrix code list, so that the matrix codes can not be used in a data transmission.

A step S88 determines whether there is a matrix code allocation request from another subscriber. If there is the matrix code allocation request in the step S88, the step S88 returns to the step S33 being a multiple checking step. If there is no matrix allocation request in the step S88, the program is terminated.

As described above, if each of the subscribers uses a different data transmission speed, a matrix code of an extended orthogonal code is first allocated as a transmission channel of a digital data on the basis of the lowest data transmission speed, a multiple of the highest data transmission speed is then calculated, and thus a matrix code of an extended orthogonal code causing a collision can be previously checked by the equation.

Further, if another subscriber requests a matrix code allocation for a digital data transmission, the present invention does not allocate a collidable code. Accordingly, the subscriber channels are not collided to one another, are able to be divided without a collision, and do not generate a digital data error.

The present invention prevents an allocation of (L×N)/M+Kth code of the collided object generated when the extended orthogonal code's matrix code generated by a hadamard extended orthogonal code generator of FIG. 1 is allocated to a plurality of subscribers who respectively use a different data transmission speed. Accordingly, the present invention previously prevents an error generated in dividing subscriber channels caused by a matrix code collision. If an extended orthogonal code is used to support a multiple-data transmission speed in a WCDMA-WLL system, the present invention is effectively applied.

The present invention can be readily applied to another communication system using a hadamard extended orthogonal code by those skilled in the art.

As described above, when a plurality of subscribers is divided by using an extended orthogonal code in a WCDMA-WLL system supporting a multiple-data transmission speed, the present invention prevents an allocation of a collidable matrix code.

Accordingly, the present invention prevents an error generated in dividing subscriber channels caused by a code collision, and enhances a reliability and a stability of a communication system.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. In a data transmission system using a plurality of transmission speeds by extending an orthogonal code, a method for preventing a collision of an extended orthogonal code, comprising the step of:

allocating a matrix code to a subscriber excepting, a matrix code occurring a collision among subscriber channels, by using a matrix code of an extended orthogonal code presently used and another data transmission speed.

2. A method for preventing a collision of an extended orthogonal code as set forth in claim 1, wherein the matrix code occurring the collision is obtained by an equation (L×N)/M+K (where, L: variable, N: extended degree of the extended orthogonal code presently used, M: multiple of a data transmission speed, and K: the extended orthogonal code's matrix code being presently used).

3. A method for preventing a collision of an extended orthogonal code as set forth in claim 2, wherein the variable L is a natural number ranging from 0 to M−1.

4. A method for preventing a collision of an extended orthogonal code as set forth in claim 2, wherein the multiple M of data transmission speed is a natural number.

5. A method for preventing a collision of an extended orthogonal code as set forth in claim 2, wherein the matrix code K ranges from an initial value 1 to N.

6. A method for preventing a collision of an extended orthogonal code as set forth in claim 2, wherein:

if an allocation of the matrix code is terminated, an allocation operation of the matrix code is repeatedly performed.

7. A method for preventing a collision of an extended orthogonal code, comprising the steps of:

(a) setting an initial value of a variable K indicating a matrix code to "1", and checking an extended degree N of an orthogonal code;

(b) checking a multiple M of a data transmission speed, and determining a range of a variable L;

(c) allocating a Kth matrix code of an orthogonal code;

(d) determining whether the allocated matrix code is a matrix code presently used or a deleted code from a matrix code list;

(e) if the allocated matrix code is neither the matrix code presently used nor the another matrix code deleted, deleting (L*N)/M+Kth matrix code from the matrix code list; and (f) determining whether there is a matrix code request requiring other matrix code.

8. A method for preventing a collision of an extended orthogonal code as set forth in claim 7, wherein the variable L in the step (b) is a natural number ranging from 0 to M−1.

9. A method for preventing a collision of an extended orthogonal code as set forth in claim 7, wherein the multiple M of data transmission speed in the step (b) is a natural number.

10. A method for preventing a collision of an extended orthogonal code as set forth in claim 7, wherein the step (d) first determines whether the allocated matrix code is a matrix code presently used, and then determines whether the allocated matrix code is a deleted code from the matrix code list.

11. A method for preventing a collision of an extended orthogonal code as set forth in claim 7, wherein:

if the allocated matrix code presently used is determined in the step (d), the step (d) returns to the step (c) after adding "1" to the variable K.

12. A method for preventing a collision of an extended orthogonal code as set forth in claim 7, wherein:

if the deleted code from the matrix code list is determined in the step (d), the step (d) returns to the step (c) after adding "1" to the variable K.

13. A method for preventing a collision of an extended orthogonal code as set forth in claim 7, wherein:

if the step (f) requests a new matrix code, the step (f) returns to the step (b).

14. A method for preventing a collision of an extended orthogonal code as set forth in claim 7, wherein:

if a new matrix code is not requested in the step (f), a termination step is performed.

* * * * *